(12) United States Patent
Takeichi et al.

(10) Patent No.: US 7,126,461 B2
(45) Date of Patent: Oct. 24, 2006

(54) DRIVING ASSISTING APPARATUS FOR VEHICLES

(75) Inventors: Masakazu Takeichi, Okazaki (JP); Yoshihisa Sato, Nagoya (JP); Koji Kato, Nagoya (JP)

(73) Assignee: Denso Corporation, Kariya (JP)

( * ) Notice: Subject to any disclaimer, the term of this patent is extended or adjusted under 35 U.S.C. 154(b) by 177 days.

(21) Appl. No.: 10/972,476

(22) Filed: Oct. 26, 2004

(65) Prior Publication Data

US 2005/0110620 A1   May 26, 2005

(30) Foreign Application Priority Data

Nov. 17, 2003  (JP) ............... 2003-387037

(51) Int. Cl.
*B60Q 1/00*  (2006.01)

(52) U.S. Cl. .............. 340/435; 340/436; 340/903; 701/96; 342/70; 180/169

(58) Field of Classification Search .......... 340/435, 340/436, 903, 904, 943, 932.2, 933; 701/96, 701/45, 93, 201; 342/70–72, 128, 99, 123; 180/169, 168
See application file for complete search history.

(56) References Cited

U.S. PATENT DOCUMENTS 5,475,494 A * 12/1995 Nishida et al. ........... 356/4.01

6,163,252 A * 12/2000 Nishiwaki ................. 340/435
6,429,804 B1 * 8/2002 Kishida et al. ............ 342/70
6,459,476 B1 10/2002 Nishimura
6,583,403 B1 6/2003 Koike et al.
6,985,075 B1 * 1/2006 Takeda .................... 340/435

FOREIGN PATENT DOCUMENTS

| JP | A-H01-161600 | 6/1989 |
|----|--------------|--------|
| JP | A-H10-62162  | 3/1998 |
| JP | A-2002-372585 | 12/2002 |

\* cited by examiner

*Primary Examiner*—Anh V. La
(74) *Attorney, Agent, or Firm*—Posz Law Group, PLC

(57) ABSTRACT

A pair of distance measurement sensors provided at different heights measures distances to an obstruction. When the measured distances are shorter than a threshold distance, the height of the vehicle is found based on the measured distances. When the height of the vehicle is found greater than a threshold height, the existence of the obstruction is reported to the driver. When the height of the vehicle is found smaller than the threshold height, on the other hand, a change in obstruction height is found and compared with a threshold. When the change in obstruction height is greater than the threshold, the existence of the obstruction is reported to the driver since the height is determined to be an unreliable result of computation.

4 Claims, 4 Drawing Sheets

DRIVING ASSISTING APPARATUS FOR VEHICLES

CROSS REFERENCE TO RELATED APPLICATION

This application is related to and incorporates herein by reference Japanese Patent Application No. 2003-387037 filed on Nov. 17, 2003.

FIELD OF THE INVENTION

The present invention relates to a vehicle driving assisting apparatus for detecting an obstruction existing in the surroundings of the vehicle and reporting the existence of the obstruction to a driver or automatically controlling the vehicle operation.

BACKGROUND OF THE INVENTION

A vehicle driving assisting apparatus disclosed in JP-A No. 1-161600 and JP-A No. 2002-372585 uses an ultrasonic wave sensor for detecting an obstruction existing in the surroundings of a vehicle. The ultrasonic wave sensor detects such an obstruction by radiating an ultrasonic wave to the surroundings and receiving the ultrasonic wave, which has hit the obstruction and been reflected by the obstruction. When the ultrasonic wave sensor detects an obstruction existing in the surroundings of the vehicle, the driving assisting apparatus reports the existence of the obstruction to the driver.

The driving assisting apparatus of this type is capable of measuring the distance between a vehicle and an obstruction by means of the ultrasonic wave sensor and changing the way of reporting the existence of the obstruction to the driver in accordance with the measured distance. For example, the driving assisting apparatus changes the volume of a sound signaling the existence of the obstruction in accordance with the distance.

In dependence on factors such as the installation location and installation angle of the ultrasonic wave sensor on the vehicle as well as the directional pattern of the ultrasonic wave sensor, however, the sensor may inadvertently detect a body, which has such a small height from the surface of the road that the body does not become as an obstacle to the travel motion of the vehicle, as an obstruction. As a result, the driving assisting apparatus unnecessarily reports the existence of such a body to the driver.

In addition to the ultrasonic wave sensor, other sensors are also known as a sensor for detecting an obstruction existing in the surroundings by radiation of an electromagnetic wave or the like to the surroundings and receiving the electromagnetic wave, which has hit the obstruction and been reflected by the obstruction. The electromagnetic wave is a beam such as an infrared ray or an electric wave. By using such other sensors for detection of an obstruction, however, the same problem also arises as well.

This is because, with a sensor capable of measuring a distance between a vehicle and an obstruction by transmission and reception of a wave, it is difficult to prescribe a measurable range of a target for the sensor installed on the vehicle in terms of the target height from the surface of the road. In addition, the measurable range changes in dependence on factors such as the installation location and installation angle of the sensor on the vehicle as well as the directional pattern of the sensor.

Thus, a driving assisting apparatus provided for a vehicle as an apparatus for detecting an obstruction by use of such a sensor is not capable of detecting only a body having a height becoming an obstacle to the travel motion of the vehicle selectively among bodies existing in the surroundings of the vehicle as an obstruction to be reported to the driver.

SUMMARY OF THE INVENTION

It is thus an object of the present invention addressing the above problems to provide a vehicle driving assisting apparatus used for detecting an obstruction existing in the surroundings of the vehicle by transmission and reception of a wave. The driving assisting apparatus is capable of preventing a body having such a small height from the surface of the road that the body does not become as an obstacle to the travel motion of the vehicle. The driving apparatus reports the existence of the obstruction to a driver or automatically controls the vehicle operation.

In accordance with the present invention, a distance from a vehicle to an obstruction is measured by each of a plurality of distance measurement sensors and used as a parameter in computing the height of the obstruction from the surface of a road in accordance with calculation conditions set in advance based on installation positions of the distance measurement sensors on the vehicle. The computed obstruction height from the surface of a road is then compared with a threshold height representing an upper limit of heights of bodies each not becoming as an obstacle to the travel motion of the vehicle in order to determine whether the computed obstruction height is smaller or greater than the threshold height. When the computed obstruction height is found smaller than the threshold height, an operation to report the obstruction to the driver or control the vehicle operation is inhibited.

Thus, even when existence of an obstruction in the surroundings of a vehicle is detected as a result of measurement of distances to the obstruction, an operation to report the obstruction to the driver or to control a vehicle is inhibited provided that the obstruction height is found smaller than the threshold height. Existence of an obstruction is reported to the driver only when the obstruction height is found greater than the threshold height, that is, only when the obstruction existing in the surroundings of the vehicle becomes as an obstacle to the travel motion of the vehicle.

When distances to an obstruction, which are measured by a plurality of distance measurement sensors provided at intervals on the vehicle in the vertical direction, and the installation positions of the distance measurement sensors on the vehicle are known, the location of the obstruction can be determined and the height of the obstruction can be found as an obstruction height from the surface of the road.

In actuality, the posture of the vehicle changes in dependence on a variety of factors such as the number of passengers, the amount of baggage, the locations of the passengers and the baggage in the vehicle, the weights of the passengers and the baggage, the air pressure of each tire, the state of suspension, the speed of the vehicle and the steering angle. Thus, calculation conditions used in finding the height of the obstruction as the obstruction height from the surface of the road based on a plurality of measured distances may not agree with the actual condition (or posture) of the vehicle. As a result, the result of the computation of the obstruction height from the surface of the road may be erroneous in some cases.

Thus, in order to allow the height of an obstruction from the surface of the road to be found with a higher degree of accuracy, a vehicle posture change from a reference posture of the vehicle is first detected. Then, the obstruction height from the surface of the road is computed preliminarily in accordance with the calculation conditions set in advance. Finally, the computed obstruction height from the surface of the road is corrected based on the result of the posture change detection. As a result, it is possible to absorb a computational error of the obstruction height from the surface of the road due to changes of the distance measurement sensor positions from the surface of the road, which are caused by a change in vehicle posture.

That is, by carrying out the above processing, even when the posture of the vehicle changes from a reference posture, which is posed by the vehicle at the time the calculation conditions are set, the height of the obstruction can be found as the obstruction height from the surface of the road with a high degree of accuracy without being affected by the change in vehicle posture. Thus, existence of an obstacle obstructing the travel motion of the vehicle can also be reported to the driver with a high degree of accuracy as well.

It is to be noted that, in detecting a change in vehicle posture, a sensor for detecting a physical quantity changing with the posture of the vehicle or a sensor for detecting a physical quantity having an effect on the posture of the vehicle can be utilized. Examples of the sensor for detecting a physical quantity changing with the posture of the vehicle are an inclination sensor for detecting an angle of vehicle inclination relative to the surface of the road, a plurality of vehicle height sensors each provided at the location of a wheel of the vehicle for detecting the vehicle-body height from the surface of the road, and air-pressure sensors each used for detecting the air pressure of a wheel tire of the vehicle. On the other hand, an example of the sensor for detecting a physical quantity having an effect on the posture of the vehicle is an acceleration sensor for detecting the acceleration and deceleration of the vehicle.

In addition, since the posture of the vehicle also changes due to the slope of the surface of the road, a change in vehicle posture may be detected by, for example, acquiring information on the slope of the surface of the road based on map information and the present position of the vehicle and then inferring the change in vehicle posture from the information on the slope of the surface of the road. The map information and the present position of the vehicle are pieces of data used in a navigation system mounted on the vehicle.

On the other hand, a vehicle can have an obstruction detection configuration in which, for example, an obstruction existing in the surroundings of the vehicle is detected and the existence of the obstruction is reported to the driver when a relatively short distance from the vehicle to the obstruction is measured by using a plurality of distance measurement sensors. When the sensitivity of each of the distance measurement sensors is high in such a configuration, however, the operation to report the existence of an obstruction to the driver may conceivably be carried out inadvertently even when the obstruction is sufficiently separated from the vehicle so that the vehicle is not exposed to danger of coming into collision with the obstruction.

In this instance, the vehicle can be provided with an obstruction detection configuration in which the existence of an obstruction is reported to the driver only when the distance from the vehicle to the obstruction measured by at least one of a plurality of distance measurement sensors is within a notification threshold distance set in advance as a distance at which the existence of an obstruction should be reported to the driver. That is, by providing the vehicle with such a configuration, the existence of an obstruction can be reported to the driver only when the obstruction is within the notification threshold distance so that the existence of an obstruction can be prevented from being unnecessarily reported to the driver.

In accordance with the present invention, each particular one of a plurality of distance measurement sensors measures the distance from the particular distance measurement sensor to an obstruction member closest to the particular distance measurement sensor based on a reflection wave reflected by the member of the obstruction. Thus, when a plurality of obstructions exists in the vicinity of the vehicle, conceivably, the distance measurement sensors may measure inadvertently distances from the vehicle to different obstructions. In addition, even when the distance measurement sensors are capable of measuring distances to only one obstruction, the distances may conceivably be distances from the vehicle to different members of the obstruction in dependence on the shape of the obstruction.

When the distance measurement sensors measure distances from the vehicle to different obstructions or different members of one obstruction, a height computed by a height computation means based on the results of the measurement is not the height of an obstruction actually existing in the vicinity of the vehicle. Thus, when a notification operation is inhibited based on the result of the computation, conceivably, even an obstacle existing in the vicinity of the vehicle so as to obstruct the travel motion of the vehicle is adversely not reported to the driver.

When a computed obstruction height from the surface of the road is found smaller than the threshold height, a deviation of heights computed a plurality of times in the past is found and, when the deviation is greater than a tolerance set in advance, the notification operation is allowed.

Thus, when a deviation of heights computed a plurality of times in the past is greater than a tolerance set in advance so that a computed height is not reliable, the operation to report an obstruction to the driver is prevented from being inhibited erroneously. In this case, an obstruction existing in the surroundings of the vehicle as an obstacle having a height from the surface of the road greater than the threshold height is certainly reported to the driver.

That is, when the distance measurement sensors measure distances from the vehicle to different obstructions or different members of one obstruction, the distances to the different obstructions or the different members of one obstruction, which become as objects of measurements carried out by the distance measurement sensors, change with the motion of the vehicle. Thus, the height computed also exhibits many large variations accompanying the movement of the vehicle.

Thus, when a deviation of heights computed a plurality of times in the past is greater than a tolerance set in advance so that a computed height cannot be determined to be a reliable result, the notification operation is allowed. In this way, the notification operation can be prevented from being inhibited erroneously in spite of the fact that an obstruction exists in the surroundings of the vehicle as an obstacle having a height from the surface of the road greater than the threshold height.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
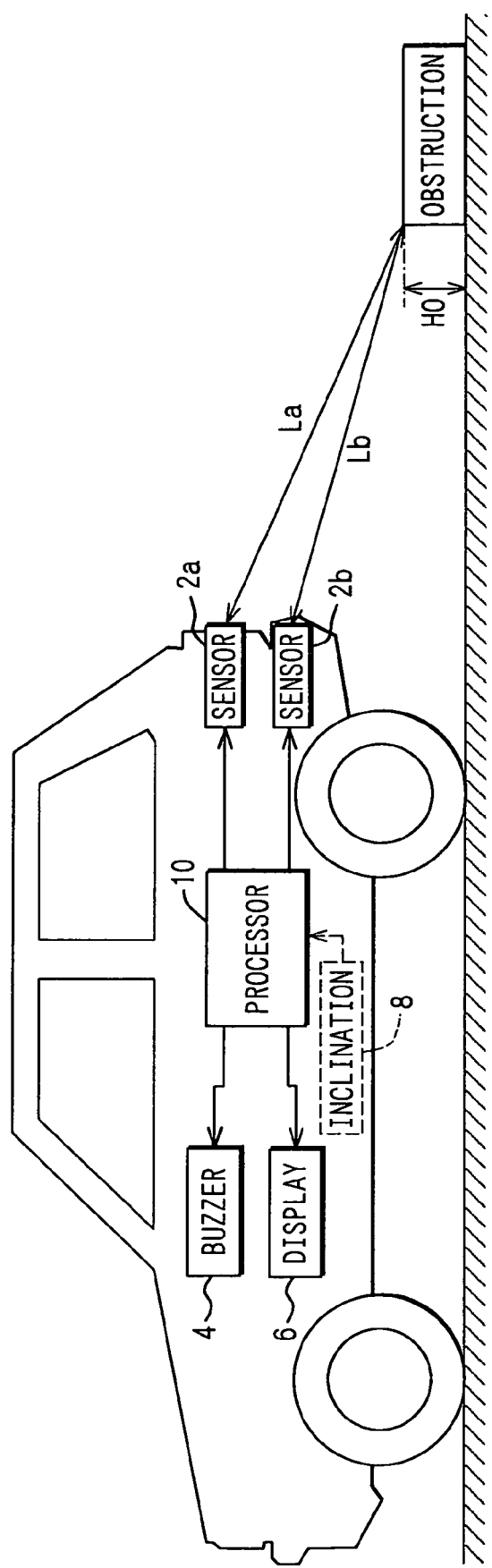
FIG. 1 is a schematic diagram showing a vehicle driving assisting apparatus according to the present invention.

In FIG. 1, a vehicle driving assisting apparatus is shown as detecting an obstruction existing at a location behind the vehicle when a driver is driving the vehicle in the backward and reports the existence of the vehicle to the driver or controls the vehicle movement. The driving assisting apparatus comprises a pair of distance measurement sensors 2a and 2b, a buzzer 4, a display unit 6, and a distance measurement processor 10. The distance measurement sensors 2a and 2b are provided at the rear end portion of the vehicle. The buzzer 4 is a component for reporting existence of an obstruction to the driver. The display unit 6 is a component for displaying a measured distance from the vehicle to an obstruction, the existence of which is reported to the driver by the buzzer 4.

The distance measurement processor 10 is a component for acquiring distances La and Lb measured by the distance measurement sensors 2a and 2b respectively as distances from the distance measurement sensors 2a and 2b to an obstruction existing at a location behind the vehicle. The processor 10 determines whether the obstruction existing in the surroundings of the vehicle at a location behind the vehicle is an obstacle obstructing the backward travel motion of the vehicle based on the results of measurement. When such an obstruction exists, the processor 10 activates the buzzer 4 to report the existence of the obstruction to the driver and activates the display unit 6 for displaying the distance from the vehicle to the obstruction on the display unit 6.

The distance measurement sensors 2a and 2b are components for measuring the distance from the distance measurement sensors 2a and 2b respectively to an obstruction existing at a location behind the vehicle. The distance measurement sensors 2a and 2b are each a well-known ultrasonic wave sensor having a configuration comprising an ultrasonic wave transmitter and an ultrasonic wave receiver. The ultrasonic wave transmitter is a component for transmitting an ultrasonic wave in the backward of the vehicle. On the other hand, the ultrasonic wave receiver is a component for receiving the ultrasonic wave emanating from the ultrasonic wave transmitter, hitting a body existing at a location behind the vehicle and returning from the body as a reflected wave.

The two distance measurement sensors 2a and 2b are provided at locations on the rear end of the vehicle. Both sensors 2a and 2b are located at substantially a center of the vehicle in the lateral direction of the vehicle. The sensors 2a and 2b are on a line drawn in the vertical direction of the vehicle in parallel to the Y axis shown in FIG. 3. The two distance measurement sensors 2a and 2b are provided at the locations separated from each other in the vertical direction by a predetermined distance.

On the other hand, the distance measurement processor 10 is a microcomputer including a CPU, a ROM, and a RAM. In addition, the distance measurement processor 10 also has a transmitter driving circuit, an input circuit and/or an output driving circuit. The transmitter driving circuit is a component for individually driving the ultrasonic wave transmitters employed in the distance measurement sensors 2a and 2b. The input circuit is a component for receiving reflected waves from the ultrasonic wave receivers provided in the distance measurement sensors 2a and 2b as input signals. The output driving circuit is a component for ringing the buzzer 4 and displaying a distance from the vehicle to an obstruction on the display unit 6.

Figure 2:
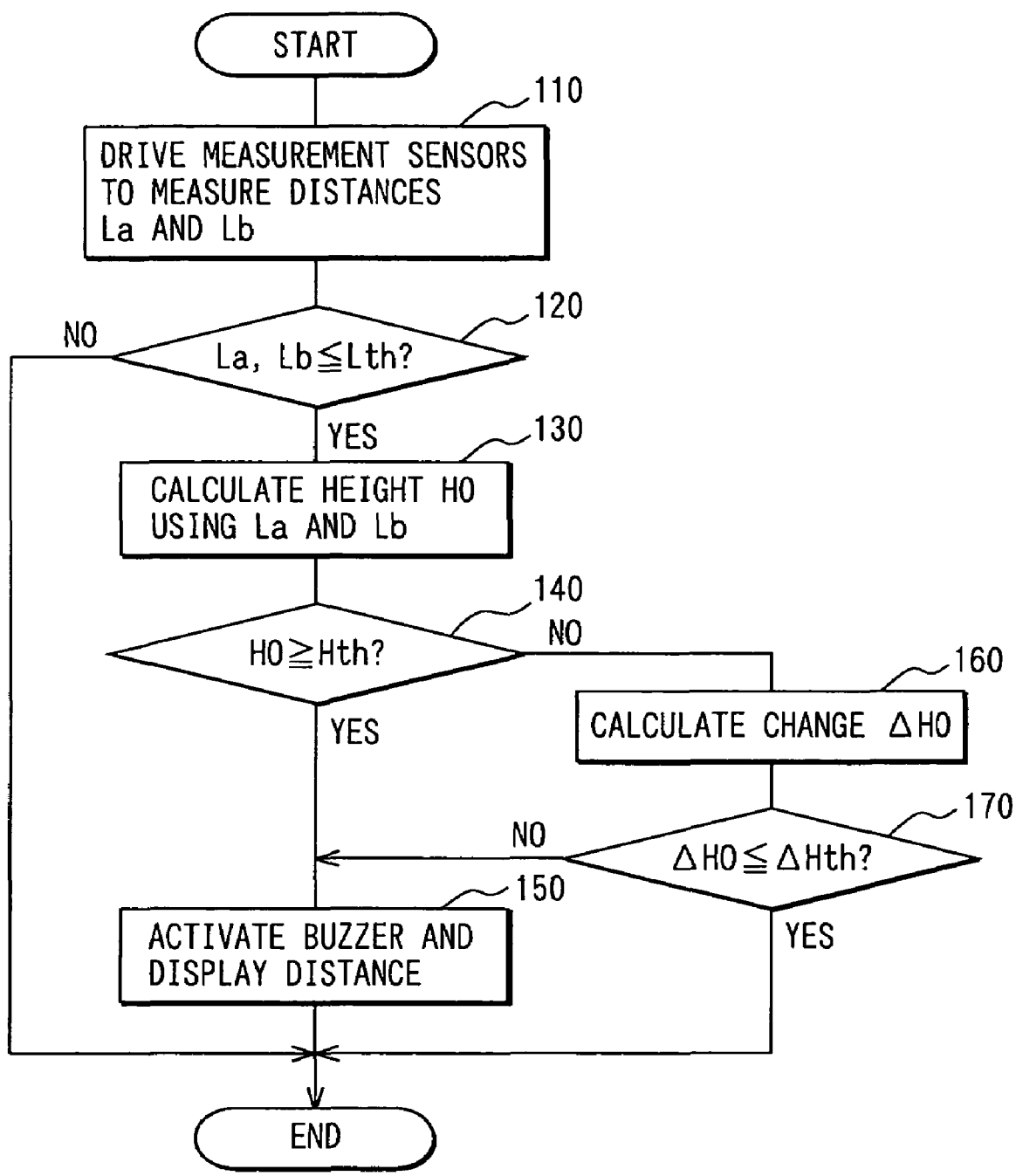
FIG. 2 is a flowchart representing an obstruction detection process carried out by a distance measurement processor shown in FIG. 1.

In the distance measurement processor 10, particularly CPU of the microcomputer, carries out obstruction detection processing shown in FIG. 2 to detect an obstacle obstructing a backward travel motion of the vehicle and controls the buzzer 4 and the display unit 6. The obstruction detection processing carried out by the distance measurement processor 10 is explained as follows.

The obstruction detection processing is a process carried out by the distance measurement processor 10 when the a gear position is switched to the reverse position in a transmission to drive the vehicle in the backward, that is, when the vehicle retreats. As shown in FIG. 2, when this processing starts, first of all, at step 110, the distance measurement sensors 2a and 2b are driven sequentially to carry out a process performed to measure respectively distances La and Lb from the distance measurement sensors 2a and 2b to an obstruction existing at a location behind the vehicle.

Specifically, the ultrasonic wave transmitter employed in each of the distance measurement sensors 2a and 2b is driven to transmit an ultrasonic wave. The times taken by the ultrasonic waves to propagate from the ultrasonic wave transmitters toward an obstruction, hitting the obstruction, and to propagate back toward the ultrasonic wave receivers, arriving at the ultrasonic wave receivers as waves reflected by the obstruction are measured to be used in calculation of distances La and Lb from respectively the distance measurement sensors 2a and 2b to the obstruction.

It is to be noted that, when no ultrasonic waves are received by the ultrasonic wave receivers employed in the distance measurement sensors 2a and 2b, the distance La and Lb are each set at an infinite value or a maximum.

At next step 120, the distances La and Lb are compared with a notification threshold distance Lth set in advance to determine whether or not the distances La and Lb are equal to or shorter than the notification threshold distance Lth. When both the distances La and Lb exceed the notification threshold distance Lth, no obstacle obstructing the backward movement of the vehicle is determined to exist. In this case, the execution of the processing is ended.

When the determination result at step 120 indicates that at least one of the distances La and Lb measured at step 110 does not exceed the notification threshold distance Lth, on the other hand, it is quite within the bounds of possibility that an obstacle obstructing the backward movement of the vehicle exists within the notification threshold distance Lth. In this case, the processing proceeds to step 130.

Then, at step 130, processing of a height computation is carried out to compute the height HO of the obstruction existing at a location behind the vehicle as a height from the surface of the road by using the distances La and Lb measured at step 110 and calculation conditions set in advance based on installation positions of the distance measurement sensors 2a and 2b. The calculation conditions include a map and calculation formulas.

Figure 3:
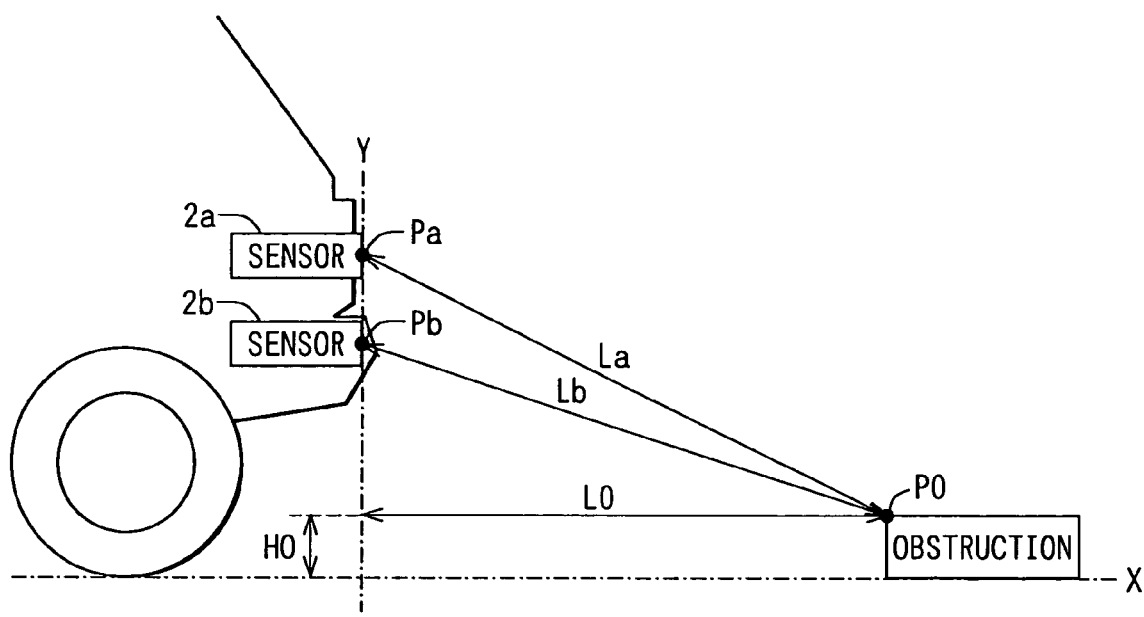
FIG. 3 is a schematic diagram showing an example of a procedure for finding the height of an obstruction from the surface of a road.

That is, as shown in FIG. 3, the distances La and Lb measured by using the distance measurement sensors 2a and 2b respectively are a distance from ultrasonic wave transmission/reception point Pa on the distance measurement sensor 2a to an ultrasonic wave reflection point PO on the obstruction and a distance from an ultrasonic wave transmission/reception point Pb on the distance measurement sensor 2b to the ultrasonic wave reflection point PO respectively.

The distance measurement sensors 2a and 2b are provided at locations on the rear part of the vehicle and the locations are separated from each other in the vertical direction by a predetermined separation distance. Thus, the altitudes of the ultrasonic wave transmission/reception points Pa and Pb on the distance measurement sensors 2a and 2b, that is their heights above the surface of the road, can be found from their installation positions.

Here, the line connecting the ultrasonic wave transmission/reception points Pa and Pb on the distance measurement sensors 2a and 2b in the vertical direction is used as an Y axis of a hypothetical plane. On the other hand, the horizontal line drawn in the backward of the vehicle in parallel to the surface of the road is used as an X axis of the hypothetical plane. At step 130, the height HO of the obstruction is typically found as follows.

On the hypothetical plane, an arc having its center at the ultrasonic wave transmission/reception point Pa on the distance measurement sensor 2a and a radius equal to the distance La is drawn. Similarly, an arc having its center at the ultrasonic wave transmission/reception point Pb on the distance measurement sensor 2b and a radius equal to the distance Lb is drawn. The arcs cross each other at the reflection point PO. Then, the Y coordinate of the reflection point PO, that is, the distance from the X axis to the reflection point PO, is found as the height HO of the obstruction.

It is to be noted that the height HO of the obstruction can be found in this way because the obstruction height HO from the surface of the road is smaller than the altitudes of the ultrasonic wave transmission/reception points Pa and Pb on the distance measurement sensors 2a and 2b, and the reflection point PO reflecting the ultrasonic waves transmitted by the distance measurement sensors 2a and 2b is common to the distance measurement sensors 2a and 2b.

When the obstruction height HO from the surface of the road is greater than the altitudes of the ultrasonic wave transmission/reception points Pa and Pb on the distance measurement sensors 2a and 2b, a reflection point reflecting the ultrasonic wave transmitted by the distance measurement sensor 2a will be shifted from a reflection point reflecting the ultrasonic wave transmitted by the distance measurement sensor 2b. In such a case, the obstruction height HO from the surface of the road can no longer be found.

For the above reason, at step 130, the height of the obstruction is computed only for a case in which the distance La measured by using the distance measurement sensor 2a provided at the higher position is longer than the distance Lb measured by using the distance measurement sensor 2b provided at the lower position by at least a predetermined difference. In other cases, the height of the obstruction is assumed to be a height obstructing the backward movement of the vehicle. That is, the height HO of the vehicle is set at a value greater than a threshold height Hth described as follows.

After the obstruction height HO from the surface of the road is computed at step 130, the processing proceeds to step 140 at which the computed height HO is compared with the threshold height Hth to determine whether or not the computed height HO is at least equal to the threshold height Hth. The threshold height Hth is the lower limit of obstruction heights obstructing the backward movement of the vehicle or the upper limit of obstruction heights causing no obstacle to the backward movement of the vehicle. The threshold height Hth is determined in advance based on vehicle parameters such as the shape of the vehicle.

When the computed height HO is found at least equal to the threshold height Hth, the processing proceeds to step 150 at which the buzzer 4 is activated and the distance between the vehicle and the obstruction is displayed on the display unit 6 in order to report the existence of the vehicle to the driver. This is because, with the computed height HO found at least equal to the threshold height Hth, the vehicle will collide with the obstruction when the backward movement of the vehicle is continued as it is.

It is to be noted that, when the existence of the obstruction is reported to the driver by ringing the buzzer 4 in processing at step 150, the volume of a sound generated by the buzzer 4 is changed in accordance with the distance between the vehicle and the obstruction. That is, the shorter the distance, the bigger the volume. The distance displayed on the display unit 6 is the shorter one of the distances La and Lb found at step 110.

When the determination result produced at step 140 indicates that the height HO of the obstruction is smaller than the threshold height Hth, on the other hand, the processing proceeds to step 160 at which a difference $\Delta HO$ between the height HO computed at step 130 and a height HO computed immediately before is found. The difference $\Delta HO$ is a change in height HO. Then, at next step 170, the difference $\Delta HO$ is compared with a tolerance $\Delta Hth$ set in advance in order to determine whether or not the difference $\Delta HO$ is within the tolerance $\Delta Hth$.

When the difference $\Delta HO$ does not exceed the tolerance $\Delta Hth$, the processing is ended. When the difference $\Delta HO$ exceeds the tolerance $\Delta Hth$, on the other hand, the processing proceeds to step 150. This is because the height HO computed at step 130 as the height of the obstruction is determined to be not a reliable result of computation. At step 150, the buzzer 4 is rung and the distance between the vehicle and the obstruction is displayed on the display unit 6 in order to report the existence of the vehicle to the driver. Then, the processing is ended.

It is to be noted that the processes, which are carried out at step 140, 160, and 170 to determine whether or not the process to report the existence of an obstruction to the driver at step 150 based on a result of computing the height HO of the obstruction in this embodiment, are for inhibiting the notification.

As described above, in the driving assisting apparatus, distances La and Lb from the vehicle to an obstruction at a position behind the vehicle are measured by using respectively the distance measurement sensors 2a and 2b provided at locations separated from each other in the vertical direction by a predetermined separation distance, the height HO of the obstruction is computed from the distances La and Lb, and the existence of the obstruction is reported to the driver when the height HO of the obstruction is found at least equal to the threshold height Hth.

Thus, in accordance with the embodiment, when a body existing at a location behind the vehicle has a height HO from the surface of the road smaller than the threshold height Hth so that the body does not obstruct the a backward movement of the vehicle, an operation to report the body to the driver as an obstruction is inhibited.

In addition, the existence of an obstruction is reported to the driver only when at least one of the distances La and Lb measured by using the distance measurement sensors 2a and 2b respectively as the distances from the distance measurement sensors 2a and 2b to the obstruction does not exceed the notification threshold distance Lth. Thus, an obstruction existing at a location far away from the vehicle can be prevented from being unnecessarily reported to the driver.

Accordingly, the number of operations to report the existence of an obstruction to the driver while the vehicle is moving in the backward can be reduced to a requisite minimum and, at the same time, a driving assisting can be well provided to the driver.

In this embodiment, on the other hand, when the obstruction height HO computed based on the distances La and Lb measured by using the distance measurement sensors 2a and 2b respectively is smaller than the threshold height Hth, the difference ΔHO between the height HO and the height HO computed immediately before is found. When the difference ΔHO exceeds the tolerance ΔHth, the operation to report the existence of the vehicle to the driver is carried out. This is because the height HO computed based on the distances La and Lb is determined to be not a reliable result of computation.

Thus, in accordance with this embodiment, when the distance measurement sensors 2a and 2b measure respectively distances La and Lb from the vehicle to different obstructions or different members of one obstruction, the obstruction height HO computed based on the distances La and Lb is not the height of an actually existing obstruction. In this case, the change ΔHO in height HO leads to detection of the fact that the obstruction height HO computed based on the distances La and Lb is not the height of an actually existing obstruction, and an operation to report the existence of an obstruction to the driver is enabled.

Accordingly, in accordance with this embodiment, when the height HO computed based on the distances La and Lb is determined to be not a reliable result of computation, incorrect inhibition of the operation to report the existence of an obstruction is avoided. Even an obstruction existing in the surroundings of the vehicle and having a height exceeding the threshold height will no longer be reported to the driver. With such an operation prevented from being mistakenly inhibited, on the other hand, the reliability of the reporting of an obstruction to the driver can be improved.

In this embodiment, the height HO of an obstruction is computed from the distances La and Lb measured by the distant measurement sensors 2a and 2b by using calculation conditions set based on the installation positions of the distant measurement sensors 2a and 2b on the vehicle. This method does not raise a problem when the vehicle is in a standard posture for setting the calculation conditions. When the vehicle is shifted from the standard posture, however, the shift may result in an error in the result of computing the height HO in some cases.

Figure 4:
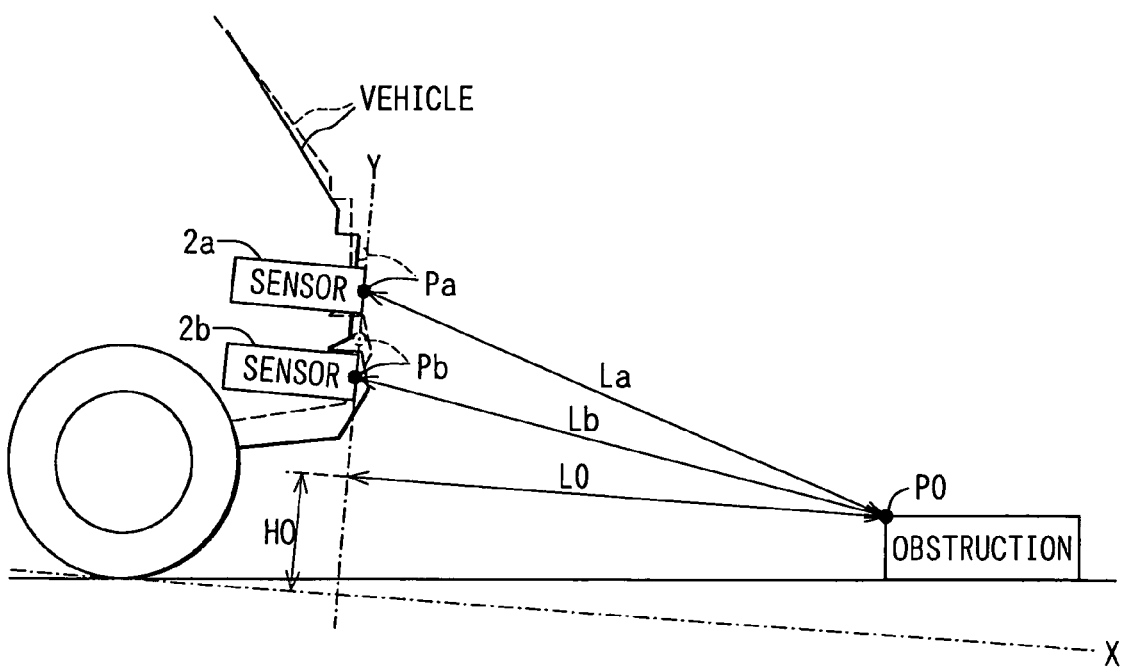
FIG. 4 is a schematic diagram showing a case in which a computational error of the height of an obstruction is caused by a change in vehicle posture from a reference posture.

That is, a passenger is sitting on a rear seat of the vehicle so that the rear portion of the vehicle is sunk down as shown in FIG. 4. In this case, the ultrasonic wave transmission/reception points Pa and Pb on the distance measurement sensors 2a and 2b respectively are shifted from their respective positions shown with dotted lines in the figure to positions shown with the solid lines. In addition, the Y axis connecting the ultrasonic wave transmission/reception points Pa and Pb to each other is also inclined.

Thus, when the height HO of the obstruction is computed by the calculation conditions set in the same way as the embodiment, a height from the X axis different from the actual surface of the road is computed. As a result, the obstruction height from the surface of the road can no longer be found with a high degree of accuracy.

Figure 5:
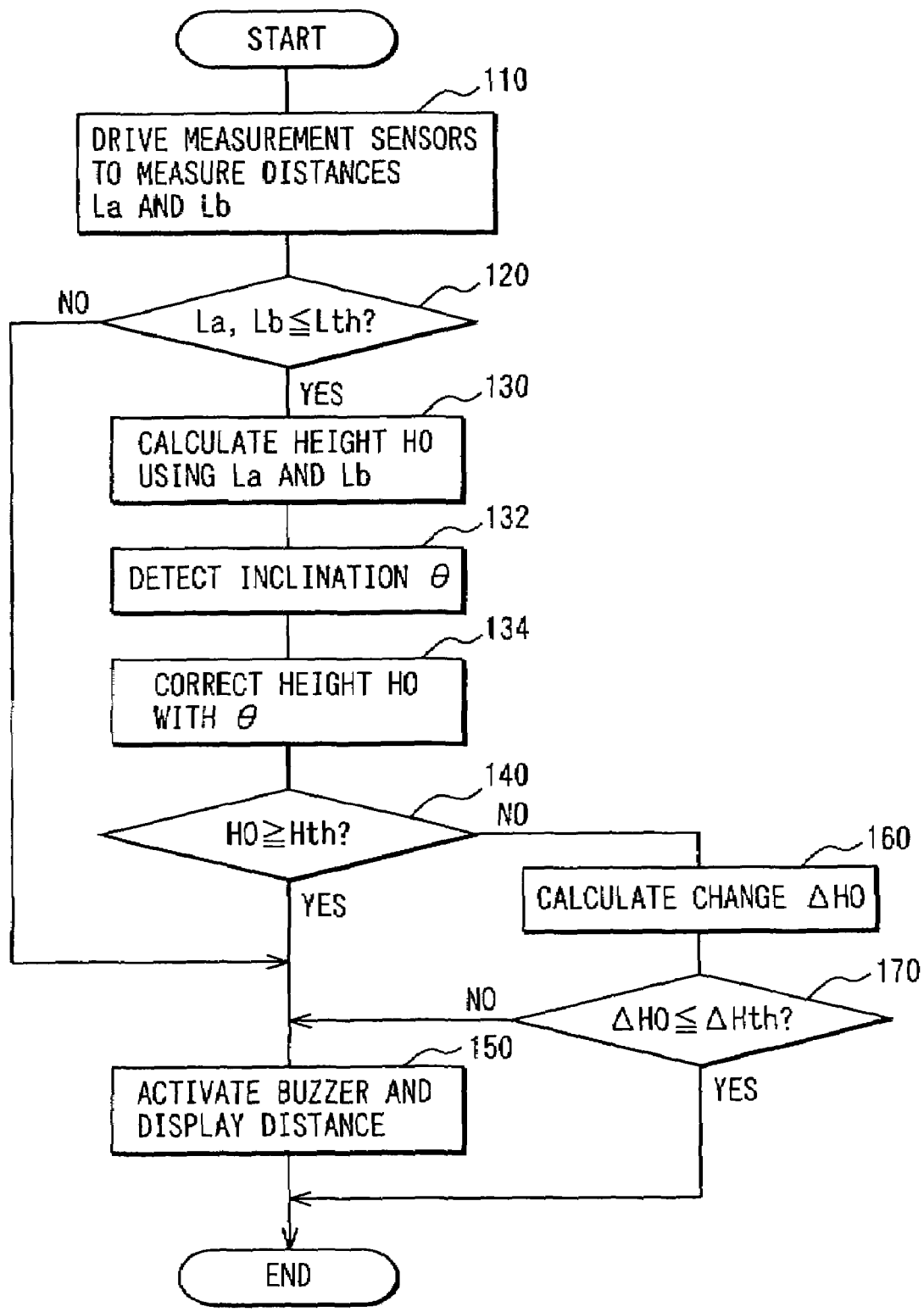
FIG. 5 is a flowchart showing a modified version of the obstruction detection process shown in FIG. 2.

As a solution, the obstruction height from the surface of a road must be found with a high degree of accuracy without regard to a change in vehicle posture. Consequently, the driving assisting apparatus is preferably further provided with an inclination sensor 8 for detecting a vertical-inclination angle θ. The inclination sensor 8 is shown as a dotted line in FIG. 1. In an obstruction detection process carried out by the distance measurement processor 10, as shown in a flowchart of FIG. 5, after the obstruction height HO from the surface of the road is found at step 130, at next step 132, the vertical inclination angle θ with respect to the longitudinal direction of the vehicle is detected by using the inclination sensor 8. Then, at next step 134, based on the detected vertical inclination angle θ, the height HO computed at step 130 is corrected to be used in subsequent processing.

That is, by using the corrected height HO as described above, even when the vehicle is vertically inclined with respect to the longitudinal direction of the vehicle from the reference posture, the height HO of an obstruction existing at a location behind the vehicle can be found with a high degree of accuracy. Therefore, the existence of an obstacle obstructing a backward movement of the vehicle can also be reported to the driver with a high degree of accuracy as well.

It is to be noted that the inclination sensor 8 corresponds a posture change detection means provided by the present invention. As a sensor for detecting a change in vehicle posture, another sensor can also be used. Examples of the other sensor are a vehicle-height sensor for detecting the height of a vehicle from the surface of the road, an air-pressure sensor for detecting the air pressure of a tire and an acceleration sensor for detecting an acceleration or a deceleration of the vehicle. In addition, since the posture of the vehicle changes in accordance with the gradient of the road, a change in vehicle posture can be inferred from information on the gradient of the surface of the road, which is acquired from a navigation system.

In addition, in the embodiment described above, the distance displayed on the display unit 6 is the shorter one of the distances La and Lb found by using the distance measurement sensors 2a and 2b respectively. However, a distance LO from the vehicle to the obstruction along a line parallel to the surface of the road or along the X axis shown in FIG. 3 can be displayed instead. The distance LO is computed at the same time when the height HO of an obstruction is found at the step 130 of the flowchart shown in FIG. 2. Then, the computed distance LO is displayed on the display unit 6 at the step 150 as a distance from the vehicle to the obstruction.

In addition, in the embodiment described above, a driving assisting apparatus for a backward movement of a vehicle is used as an apparatus for detecting an obstacle, which exists at a location behind the vehicle, hence, obstructing the backward movement of the vehicle, and for reporting the existence of the obstacle to the driver. However, the same effects of the embodiment can also be obtained even when the present invention is applied to any other driving assisting apparatus in the same way as the embodiment as long as the other driving assisting apparatus detects an obstruction existing in the surroundings of the vehicle by means of a distance measurement sensor using an ultrasonic or electromagnetic wave and reports the existence of the obstruction to the driver.

An example of such a driving assisting apparatus is a driving assisting apparatus comprising a pair of upper and lower distance measurement sensors 2a and 2b provided at each of the front, rear, left and right corners of the vehicle, using these distance measurement sensors as means for detecting an obstruction existing at a location in front of the vehicle and reporting the existence of the obstruction to the driver.

Further modifications and alterations are also possible without departing from the spirit of the invention.

What is claimed is:

1. A driving assisting apparatus comprising:
   a detection means for detecting an obstruction near a vehicle by radiating a wave to the surroundings and receiving the wave reflected by the obstruction; and
   an assisting means for assisting driving of the vehicle when the detection means detects the obstruction,
   wherein the detection means has:
   a plurality of distance measurement means each provided at predetermined intervals on the vehicle in a vertical direction and each used for measuring a distance to the obstruction based on time taken by the wave to propagate to the obstruction, hitting the obstruction and to propagate back;
   a height computation means for computing a height of the obstruction from a surface of a road by using the distance measured by each of the distance measurement means as a parameter representing a distance to the obstruction in accordance with calculation conditions set in advance based on installation positions of the distance measurement means on the vehicle; and
   an inhibition means for comparing the computed obstruction height from the surface of the road with a threshold height representing an upper limit of heights of bodies each not becoming as an obstacle to a travel motion of the vehicle to determine whether the computed obstruction height is smaller or greater than the threshold height and inhibiting an operation of the assisting means for a computed obstruction height found smaller than the threshold height.

2. The driving assisting apparatus according to claim 1, further comprising:
   a posture change detection means for detecting a posture change from a reference posture of the vehicle,
   wherein the height computation means corrects the height from the surface of the road, which is computed in accordance with the calculation conditions based on a detection result, by the posture change detection means to absorb a height computational error caused by a change in vehicle posture.

3. The driving assisting apparatus according to claim 1, wherein the assisting means reports existence of an obstruction to the driver when a distance measured by at least a particular one of the distance measurement means from the particular distance measurement means to the obstruction is shorter than a notification threshold distance set as a distance at which existence of an obstruction should be reported to the driver.

4. The driving assisting apparatus according to claim 1, wherein when the height from the surface of the road, which is computed by the height computation means, is smaller than the threshold height, a deviation of heights computed by the height computation means a plurality of times in the past is computed, the inhibition means allows the assisting means to attain the assisting operation when the deviation is greater than a threshold set in advance.

* * * * *